(12) United States Patent (10) Patent No.: US 8,271,873 B2
El-Shishiny et al. (45) Date of Patent: Sep. 18, 2012

(54) AUTOMATICALLY DETECTING LAYOUT OF BIDIRECTIONAL (BIDI) TEXT

(75) Inventors: Hisham E. El-Shishiny, Cairo (EG); Waleed M. Oransa, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/843,891

(22) Filed: Jul. 27, 2010

(65) Prior Publication Data

US 2011/0107202 A1 May 5, 2011

(30) Foreign Application Priority Data

Oct. 30, 2009 (EP) ..................................... 09174679

(51) Int. Cl.
*G06F 17/00* (2006.01)
(52) U.S. Cl. ......... 715/264; 715/243; 715/255; 715/258
(58) Field of Classification Search .................. 715/243, 715/255, 258, 264
See application file for complete search history.

(56) References Cited

U.S. PATENT DOCUMENTS

| | | | | |
|---|---|---|---|---|
| 5,784,071 A | * | 7/1998 | Tang et al. | ..................... 345/467 |
| 5,812,122 A | * | 9/1998 | Ng | ................ 715/703 |
| 6,910,185 B1 | | 6/2005 | Schwartz | |
| 6,944,820 B2 | * | 9/2005 | Feinberg | ....................... 715/273 |
| 7,293,229 B2 | | 11/2007 | Feinberg | |
| 2008/0025610 A1 | | 1/2008 | Abdulkader | |
| 2009/0144666 A1 | | 6/2009 | Lu et al. | |

OTHER PUBLICATIONS

The Open Group, Portable Layout Services: Context-dependent and Directional Text/ Layout API, 1997, pp. 1-21.*

* cited by examiner

*Primary Examiner* — Adam M Queler
*Assistant Examiner* — Howard Cortes
(74) *Attorney, Agent, or Firm* — Marcia L. Doubet

(57) ABSTRACT

Automatically detecting the layout of a bidirectional (BIDI) text. In one embodiment, this comprises: determining a shaping attribute of the text based on scanning the text to detect at least one character of a specific shape, while preferably ignoring initial, final, and stand-alone shaped characters; determining a text type attribute of the text from the shaping attribute; and determining an orientation attribute of the text from the determined text type. A numeric shaping attribute and a symmetric swapping attribute may also be determined. Embodiments of the invention may be used, by way of illustration but not of limitation, for bidirectional layout transformation to allow conversion of a BIDI text received from a source computer system in a source BIDI layout format into a layout format of a target computer system.

13 Claims, 10 Drawing Sheets

| Ordering scheme | Example (Memory Representation) |
|---|---|
| Logical | ا ل ل غ ة   ا ل ع ر ب ي ة |
| Visual | ة ي ب ر ﻌ ل ا   ة ﻐ ل ا |

FIGURE 1

| Symmetrical Swapping | Example (memory Logical ordering scheme) | Display |
|---|---|---|
| OFF | س > ص | س > ص |
| ON | س > ص | س < ص |

FIGURE 2

AUTOMATICALLY DETECTING LAYOUT OF BIDIRECTIONAL (BIDI) TEXT

CROSS REFERENCE TO RELATED APPLICATION

This application claims priority of European Patent Application Serial No. 09174679.2 entitled "A system and a method for automatically detecting layout of a bidirectional (BIDI) text", filed on Oct. 30, 2009.

BACKGROUND

The present invention generally relates to text processing applications in computer systems, and more particularly to detecting layout of bidirectional (BIDI) text.

Most written languages such as Latin (or Cyrillic or Greek) text are written in a direction from left to right (LTR). However, some other written languages such as Arabic, Hebrew, Urdu, and Farsi (Persian) are written in a direction from right to left (RTL). When a text includes both LTR text segments and RTL text segments, each type of text should be written in its own direction, thus forming a bi-directional text, also known as "BIDI". A computer system having a BIDI support capability can display texts of different languages on the same page and on the same line, even if the languages have different text directionalities.

However, BIDI rules are very complex, and the rules implemented by different software are usually not unified. Indeed, the same script can contain two or more kinds of texts having different writing directions, and texts having different writing directions can refer to each other or even refer in a multi-layer way. A BIDI document can contain special texts such as dates, numbers, formulae, etc.

Historically, BIDI data stored on legacy systems (e.g., mainframe systems) was in what is called a "visual" layout: that is, the data was stored in memory in the same order it is shown on displays (usually terminals or printers). This had the advantage that no special processing was needed to format the data for presentation, since it was already in presentation form. Since the data only existed on a single platform, it did not matter what form was used. With the advent of processing power closer to end users, the new personal computer systems turned to storing the BIDI data in what is called a "logical" layout. This means that the data are stored in memory in the order they are typed, not how they are displayed. This has the advantage that BIDI data can be processed as non-BIDI data (i.e., searching, sorting, and parsing can be done using the same modules used with non-BIDI data). In order to display BIDI data stored in logical layout, the system renders the data for presentation, which is usually done using BIDI Layout Engines (for text environments) or BIDI Layout Engines embedded in font (for graphical environments). Since the data only exists on the personal computer, it does not matter what form is used.

However, data in visual layout are still preponderant on certain computer systems, such as legacy systems (IBM zSeries® mainframes, IBM iSeries®), while in other systems like Windows® systems, most data are created and processed in logical layout. There also exist systems that can handle data in either logical or visual layout (e.g., IBM AIX®). Some graphical user interface (GUI) components, such as Java® GUI components, expect BIDI textual data to be in logical layout. BIDI text within HTML may be in either logical or visual layout, but it is generally more convenient to format the data in logical layout, and browser support for data in logical layout is also preferred. (As they may be cited herein, zSeries, iSeries, and AIX are registered trademarks of International Business Machines Corporation in the United States, other countries, or both; Java is a registered trademark of Sun Microsystems, Inc, in the United States, other countries, or both; and Windows is a registered trademark of Microsoft Corporation in the United States, other countries, or both.)

BIDI text stored in a specific bidirectional (BIDI) layout of one system cannot be displayed and processed properly on other systems which are using a different BIDI layout. In order to display such text properly on other systems, a process of BIDI transformation needs to be applied to transform the text from its BIDI layout format (source BIDI format) to another BIDI format (target BIDI format). There exist some BIDI transformation tools that allow for transformation of a BIDI text from one BIDI layout to another. These BIDI transformation tools have four prerequisites:

1) The source text BIDI layout should be known;
2) The target text BIDI layout should be known;
3) A manual configuration should be performed in order to associate the BIDI layout for the source with the source text; and
4) A manual configuration should be performed in order to provide the desired BIDI layout of the target text (i.e., output text), or a default BIDI layout format is assumed for the target text.

However, in certain situations, the user is not aware of the source text BIDI layout. It also occurs that even if the user is aware of the source BIDI layout format, the manual configuration is not possible (e.g., there are many sources and it is difficult to configure BIDI layout for each of them, or all source text is received from a specific queue). In such situations, the text might be corrupted because it will be displayed in another BIDI layout and hence the text will not be readable.

Further, to fulfill the above requirements, the user has to use a configuration tool or a user interface (UI) to supply the proper BIDI layout format for the input text and output text. Accordingly, the system has to provide a proper GUI for configuration of the BIDI layout format per text source and text target. This puts an overhead on the end user, as well as consumes time and effort either from the system end user or the system developers. Another aspect of the problem is the usability and consumability problem, due to the need for the user to manually perform the configuration. In some applications—for example, an application that deals with a lot of sources with unknown BIDI layout format—the configuration is not possible due to the nature of the application.

A known solution to this problem is the approach taken in Unicode BIDI Algorithm, which is published as Annex 9 of the Unicode standard. Unicode Standard defines a basis for complete BIDI support. The standard specifies detailed rules on how to code and display an LTR and RTL mixed text. In the Unicode coding, all characters are stored in the writing order, while it is determined by software in what direction the text is to be displayed on a page or screen. Thus, all computer systems complying with the Unicode standard can display texts from different languages correctly in the same script, regardless of whether the writing directions of the texts are identical or not. The Unicode BIDI Algorithm defines optional steps that depend on setting the base direction attribute according to the first strong character. However, using the first strong character is risky since the user may enter English text as the first word in RTL text. Further, the first-strong-character approach assumes that the RTL language user always writes an RTL letter at the beginning of the text, but this is not always the case.

BRIEF SUMMARY

The present invention is directed to automatically detecting the layout of BIDI text. An embodiment of the present invention may be provided as a method, system, or computer program product. In one embodiment, this comprises: determining a shaping attribute of said text based on scanning said text to detect at least one character of a specific shape; determining a text type attribute of said text from said shaping attribute; and determining an orientation attribute of said text from the determined text type attribute.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIG. 1 shows a table illustrating a memory representation for Arabic scripts in visual and logical text layout;

FIG. 2 shows a table illustrating the impact of the symmetrical swapping layout attribute enablement/disablement;

Figures 3, 4:
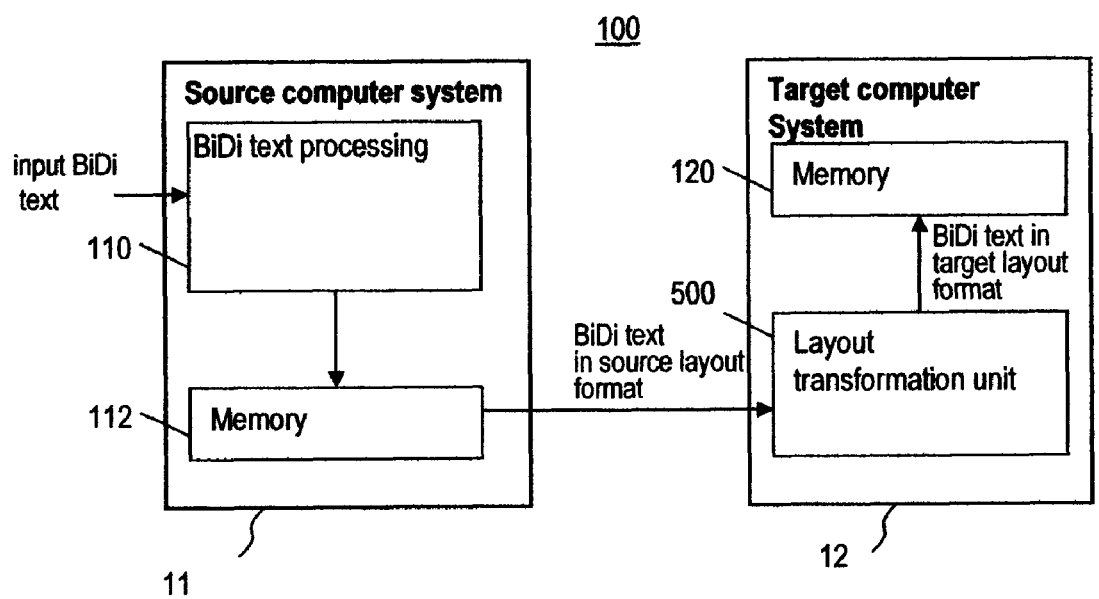
FIG. 3 shows a table illustrating the four Arabic letter shapes, for a particular sample Arabic letter.
FIG. 4 shows an exemplary computer environment for implementing the invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION

The present invention is directed to detecting the layout of a bidirectional text (BIDI). According to an embodiment of the invention, the detection of the layout is based on specific attributes in the text.

A bidirectional text layout is identified by the values of a set of bidirectional attributes. Once determined, these attributes are usually stored external to the text (for example, in an external resource file). Five bidirectional attributes may be used in combination:

1. a "Base Direction" (also called "Orientation") attribute;
2. an "Ordering Scheme" (also called "Text Type") attribute;
3. a "Symmetric Swapping" attribute;
4. a "Text Shaping" attribute; and
5. a "Numeric Shaping" attribute.

The Text Shaping and Numeric Shaping attributes are used primarily for Arabic BIDI script.

The Base Direction attribute, also called "orientation" or "global orientation" or referred to as "writing order" or "reading order" or "paragraph orientation", determines the side of the screen, window, page, or field where the rendering engine starts laying out directional segments. The next segments progress in the direction of the global orientation. If a bidirectional text has been created in storage with the intent to be presented in a right-to-left global orientation, and is instead rendered with a left-to-right global orientation, the relative order of the different segments (and of the punctuation) gets mixed up and the text does not make sense.

As an example with a text in logical ordering scheme, using upper case Latin for Arabic letters and lower case for English letters, the Arabic sentence "I WORK IN france AND TRAVEL TO canada." should be rendered with right-to-left global orientation as ".canada OT LEVART DNA france NI KROW I". If rendered with left-to-right global orientation, it would be "NI KROW I france OT LEVART DNA canada.", which is unreadable.

The Ordering Scheme attribute (also called "Text type") is defined as the order in which bidirectional text is stored and processed. There exist two main text types used for storing BIDI text: visual (or physical) and logical (also called implicit). Visual text type is the oldest ordering scheme and as stated above, text stored in visual layout is more or less a simple copy of the text in the order it is displayed on a screen (and this is why it is called "visual"). In the visual ordering scheme, the programmer needs to know the structure of the data in order to handle each and every segment. A large majority of vintage applications running on mainframes assumes this type of text for the data processed in the mainframe data bases and files. Logical (or implicit) text type assumes that the letters of the Latin alphabet have inherent left-to-right directionality and that Arabic and Hebrew characters have inherent right-to-left directionality and as stated above, text stored in logical layout is stored in the order it is typed (and not in the order it is displayed). To accommodate bidirectionality, an algorithm is used to recognize segments based on their inherent directional characteristics, allowing segment inversion to be performed automatically.

FIG. 1 shows a memory representation for Arabic language in both logical and visual text layout. As shown, the visual text inputted by the user is always shaped.

The Symmetric Swapping attribute relates to the operation performed by rendering programs for certain characters such as "<", "(", "[" or "{" that have a symmetric character with an opposite directional meaning (">", ")", "]", "}"). This is done in order to preserve the semantics of expressions such as "A>B" when presented from right-to-left so that, in this example, the expression will appear as "B<A", and not as "B>A".

FIG. 2 illustrates the impact of symmetric swapping layout attribute enablement/disablement.

The Text Shaping attribute is specific to Arabic script, which is cursive. In most cases, adjacent Arabic characters are connected to one another, although some of the Arabic characters do not connect to the next character on the left. To accommodate the need for the cursive nature of the Arabic characters, the Arabic characters can have up to four different shapes, as illustrated in FIG. 3:

1. an isolated shape, when there is no need to connect on any side;

2. an initial shape, when connection is required only for the next character on the left;
3. a middle shape, where connection is required on both sides; and
4. a final shape, where connection is required only with the character on the right.

In some Arabic code pages, separate code points are allocated for each possible character shape. In other Arabic code pages, there is a single representative code point for each Arabic character, and thus Arabic text is stored in a shape-independent manner. In this latter case, at presentation time, the rendering program must apply a shaping algorithm in order to choose the proper shape (and the appropriate glyph of the font) to correctly represent the Arabic script text.

An Arabic shaping process performs basic operations for "shaping" Arabic text. It is most useful for use with legacy data formats and legacy display technology (simple terminals). All operations can be performed on single byte (e.g., EBCDIC) or Unicode characters.

Text-based shaping means that some character code points in the text are replaced by others, depending on the context. It transforms one kind of text into another. In comparison, modern displays for Arabic text select appropriate, context-dependent font glyphs for each text character, which means that they transform text into a glyph vector.

The Numeric Shaping attribute is also specific to Arabic script. Numeric Shaping designates the process of replacing of digits from one digit type to another. The Arabic-European digits 0 through 9 are also used in some Arabic western countries, but in other eastern Arabic countries, another set of digits called Arabic-Indic digits is preferred (known in the Unicode Standard as "Arabic-Indic").

FIG. 4 illustrates an exemplary computer environment 100 for implementing an embodiment of the invention. The computer architecture 100 includes a source computer system 11 having a source BIDI layout and a target computer system 12 having a target BIDI layout. The source computer system 11 is arranged to exchange bi-directional data with the target computer system 12. For example, the source BIDI layout can be a visual RTL layout, while the target BIDI layout is a logical LTR layout.

Each computer system 11 and 12 may include a CPU, a display, a keyboard, a mouse, and a network connection. The source system 11 and the target system 12 may be embodied as separate software systems that reside on different computer architectures. Alternatively, they may reside on the same computer architecture or even on the same computer.

When a user of source computer system 11 enters a BIDI text, this text is processed by the BIDI processing unit 110 and stored in memory 112 according to the source BIDI layout. If the computer system 11 is requested to provide the BIDI text to the computer system 12, the text in the source BIDI layout format is retrieved from the memory 112 of computer system 11 and passed to computer system 12 for bi-directional layout conversion by a bi-directional layout transformation unit 500 before storage in memory 120. The source computer system 11 may be, for example, a data server while the target computer system 12 may be a client. The need to perform a layout transformation may arise because the data server uses a different layout for storing bidirectional text than the layout used by the client. When the client connects to the data server for receiving text, the text needs to be converted to the layout that the client supports.

Figure 5:
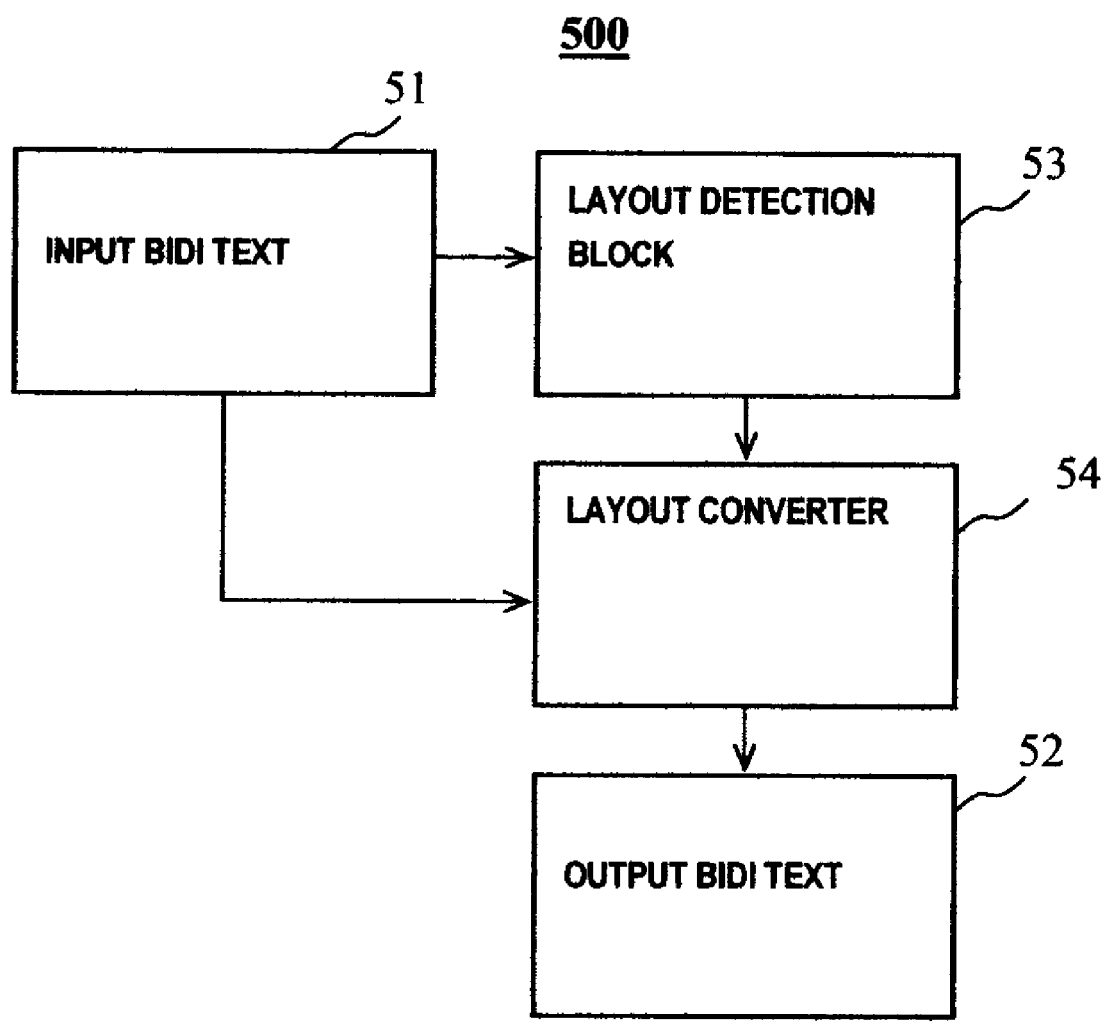
FIG. 5 shows a high-level view of a layout transformation unit in accordance with an embodiment of the invention.

FIG. 5 illustrates the general structure of the layout transformation unit 500 in accordance with an embodiment of the invention. The layout transformation unit 500 processes each input BIDI text 51 received by the target computer system 12 from the source computer system 11 to identify the BIDI layout of the source computer system and convert the input BIDI text into the target BIDI layout, thereby providing an output BIDI text 52 in the target layout format. The layout transformation unit 500 includes a layout detection block 53 for detecting the BIDI attributes of the input BIDI text and a layout converter 54 for converting the BIDI text into the target layout format from the detected source layout.

Figure 6:
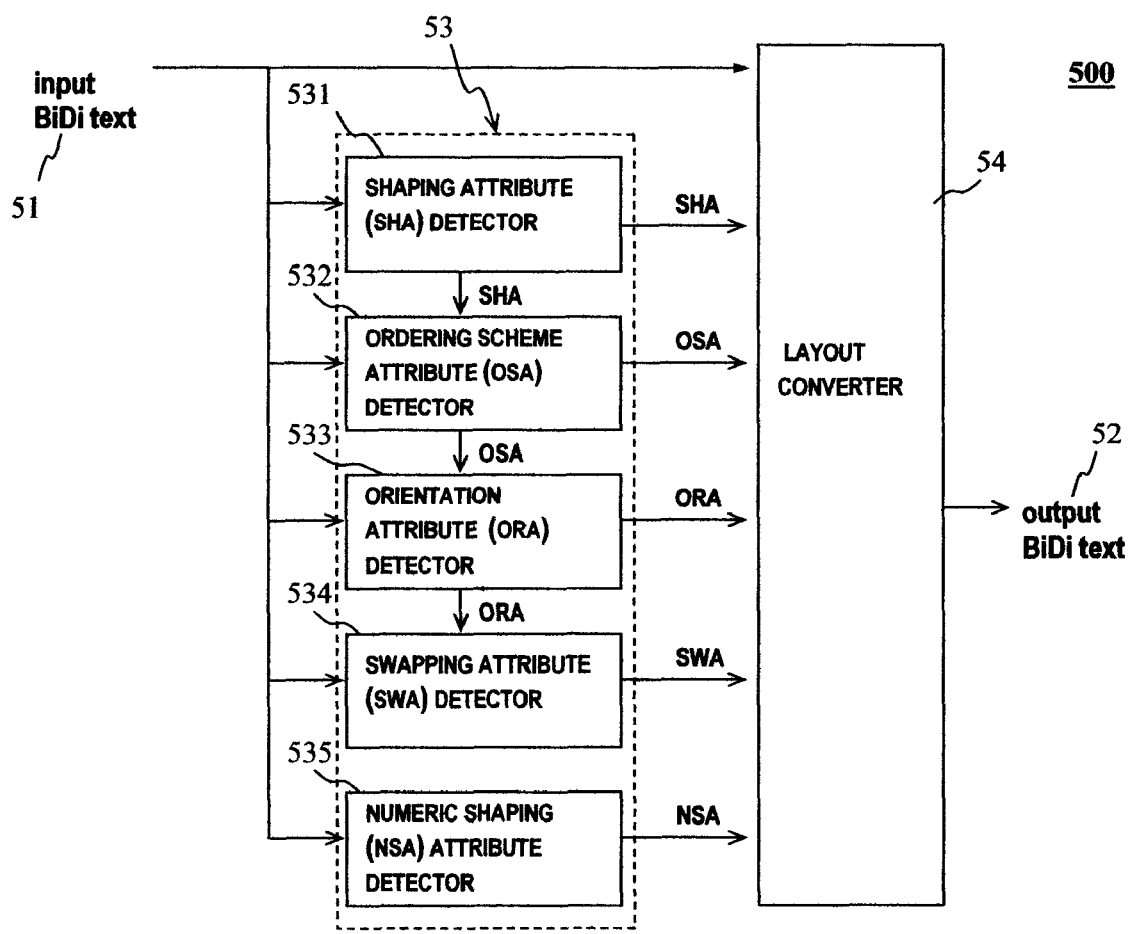
FIG. 6 shows a more detailed view of the layout transformation unit.

FIG. 6 is a block diagram illustrating in more detail the structure of the layout transformation unit 500. As shown, the source layout detection block 53 includes a number of detectors 531 to 535 for detecting the five BIDI attributes of the source layout in the input BIDI text. The detected BIDI attributes are then transmitted to the layout converter 54 that identifies the source layout from the detected BIDI attributes and converts the BIDI text into the target source layout if the target BIDI layout is different from the source BIDI layout. The layout converter 54 receives the input text in the source BIDI layout format and transforms it to a semantically equivalent string conforming to the target BIDI attributes.

The input text source is preferably received as a digital Unicode text. If the input text is received in a non-Unicode code page, a simple code page conversion unit can be used to convert the input text encoding from a known other encoding to Unicode encoding.

In accordance with an embodiment of the invention, the shaping attribute detector 531 automatically detects the text shaping attribute (SHA) of the BIDI text 51 based on scanning the input BIDI text and identifying only a middle shaped Arabic script character, ignoring initial, final, and stand-alone shaped characters.

The ordering scheme attribute (OSA) detector 532 detects the ordering scheme attribute, using the shaping attribute computed by detector 531.

The orientation attribute detector 533 detects the orientation attribute (ORA) based on the result of the detection of the ordering scheme attribute as performed by detector 532. In particular, if a visual ordering scheme is detected by the ordering scheme detector 532, then the orientation attribute detector 533 processes each word in the input text and, for each word, detects the orientation attribute based on identifying the shape of the first letter (initial or final shape) in the word (from memory perspective) and the shape (initial or final shape) of the last letter in the word (from memory perspective). However, if the word characters at the beginning and ending of the word are not shaped based on their own connectivity properties (especially for the challenging case of having a small number of Arabic script words), then the orientation attribute is instead detected based on identifying the Latin word letter case in the text (i.e., upper case or lower case) of the first letter in each non-Arabic script word (from memory perspective) and the Latin letter case of the last letter in each non-Arabic script word (from memory perspective). However, if non-Arabic script words are not usable to detect the orientation attribute because of absence of usage of upper and lower case for non-Arabic script words in the input text, then the orientation attribute is instead detected based on the result of searching for the Arabic script word, and for its reversed (character-wise) word, in Arabic script word lists. The word can be searched in the word lists before or after normalizing the Arabic script word letters to their Unicode intrinsic code points. Also, one or more word lists can be used for the searching.

If a logical ordering scheme is detected by the ordering scheme detector 532, then the orientation attribute detector 533 detects the orientation attribute based on counting the Arabic script and the non-Arabic script words, and selecting the orientation attribute in view of the higher count. Alternatively, the orientation attribute detector 533 may detect the orientation attribute using Arabic script and non-Arabic letter counts instead of word counts.

The swapping attribute detector 534 detects the symmetric swapping attribute (SWA) using the ordering scheme attribute detected by detector 532 and the orientation attribute detected by detector 533. More specifically, as the symmetric swapping attribute is associated with text type and base direction attributes, for visual LRT the symmetric swapping attribute will be set to an OFF value, while for logical or visual RTL the symmetric swapping attribute will be set to an ON value.

The numeric shaping attribute detector 535 detects the numeric shaping attribute (NSA) based on scanning of the text for Arabic-European and "Arabic-Indic"/"Eastern Arabic-Indic" digit code points using the digit code point ranges in Unicode.

The layout converter 54 performs the BIDI transformation to the target BIDI layout format, based on the BIDI layout attributes detected by detector block 53. The layout converter 54 provides a digital Unicode text output in the target layout format. Depending on the source BIDI layout and target BIDI layout, this conversion may be done according to the Unicode Bidirectional Algorithm (UBA) or the inverse of UBA as defined in Annex 9 of the Unicode Standard.

Figure 7:
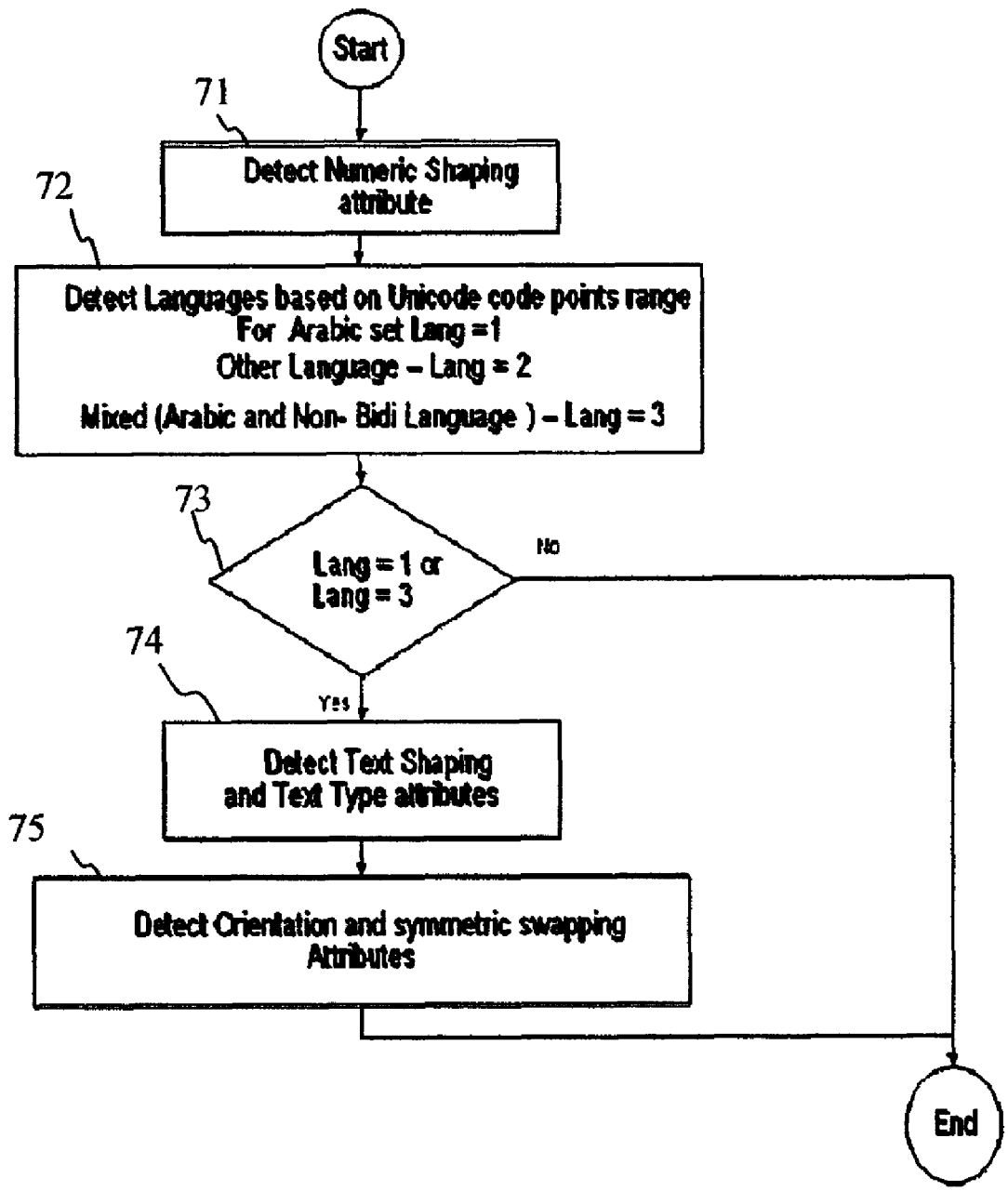
FIG. 7 shows a flowchart for detection of a BIDI layout from a text.

FIG. 7 is a flowchart illustrating the detection of the layout of a BIDI text according to an embodiment of the invention.

In Block 71, the numeric shaping attribute is detected based on Unicode code points. Arabic-European digits, Arabic-Indic, and Eastern Arabic-Indic digits code points have different Unicode ranges, which are well known. The numeric shaping attribute is detected from the text based on the existence of one or more digits, as determined from the existence of the code point(s). Existence of more than one shape of digit indicates that the numeric shaping attribute is set to "contextual", while in the other cases this attribute is assigned a value of "nominal" (indicating use of only Arabic-European digits) or "national" (indicating use of only Arabic-Indic or Eastern Arabic-Indic digits) numeric shaping, depending on the detected digits. See FIG. 8, which is discussed below, for more information on detecting the numeric shaping attribute.

In Block 72, the languages are detected based on the character code points used in the text. Arabic characters Unicode range is hexadecimal 0600 through 06FF and FE70 through FEFF while other Unicode ranges are for other languages. Accordingly, Block 72 creates a language parameter "Lang" and sets it to 1 if the language used in the text is detected as Arabic, to 2 if the text does not contain Arabic, and to 3 for mixed text (i.e., text that contains Arabic and other languages).

In Block 73, if it is determined that the language parameter Lang is equal to 1 or 3, this indicates that the text contains Arabic characters and Block 74 is therefore performed. Otherwise, the processing in FIG. 7 ends.

In Block 74, the text shaping attribute and the ordering scheme (i.e., text type) attributes for Arabic or Mixed Arabic text are then detected. See FIG. 9, which is discussed below, for more information on detecting the text shaping attribute and the ordering scheme attribute.

In Block 75, the orientation and symmetric swapping attributes for Arabic or Mixed Arabic text are detected and the detection processing in FIG. 7 ends. See FIGS. 10-12, which are discussed below, for more information on detecting the orientation and symmetric swapping attributes.

Figure 8:
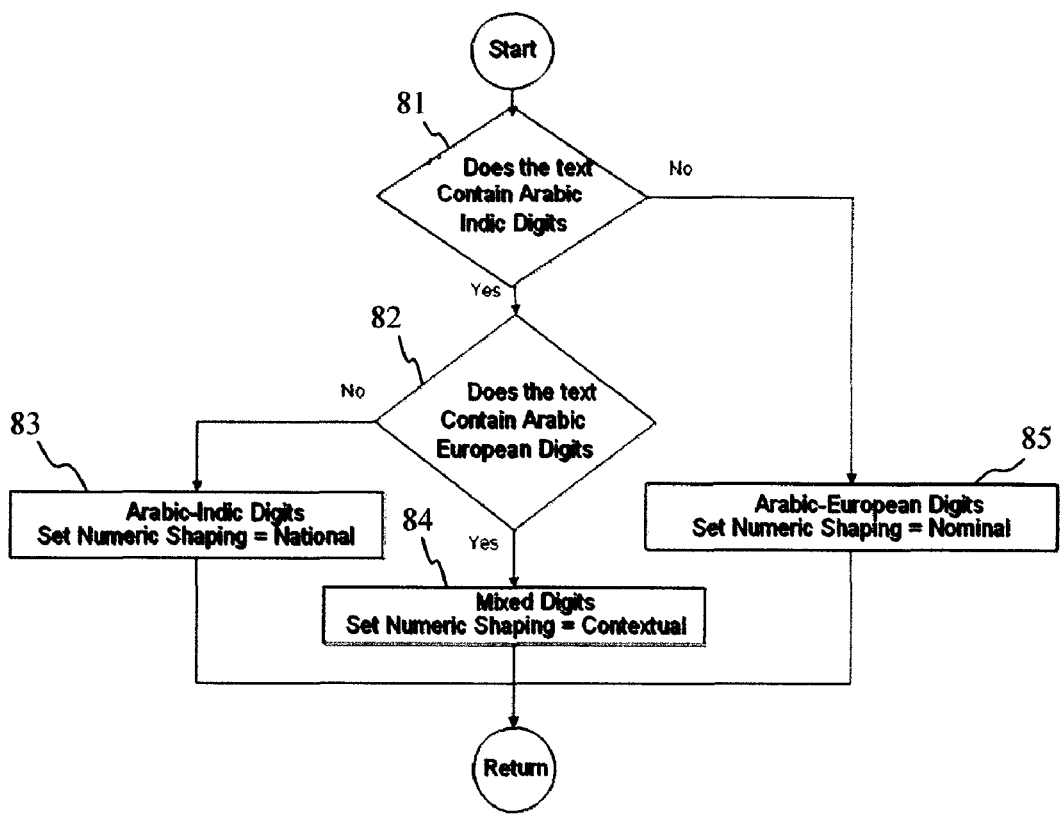
FIG. 8 shows a flowchart for detection of a numeric shaping attribute.

FIG. 8 illustrates the detection of a numeric shaping attribute by evaluating digits in the text (as discussed above with reference to Block 71 of FIG. 7). The digits may be of Arabic-European type, of Arabic-Indic or Eastern Arabic-Indic type, or of mixed type.

In Block 81, it is determined if the text contains Arabic-Indic digits. If Arabic-Indic digits are found, then in Block 82, a search is performed to determine if the text also contains Arabic European digits. If no Arabic-European digit is found, the numeric shaping attribute is set to "national" in Block 83. If one or more Arabic European digits are found, the numeric shaping attribute is set to "contextual" to identify mixed digits in Block 84. If no Arabic Indic digits are found in Block 81, the numeric shaping value is set to "nominal" in Block 85. A "nominal" value indicates that the text layout is using only Arabic-European digits, while a "national" value indicates that the text layout is using only Arabic-Indic digits. A "contextual" value (i.e., "mixed" value) indicates that the text layout is using both Arabic-European and Arabic-Indic (or Eastern Arabic-Indic).

Figure 9:
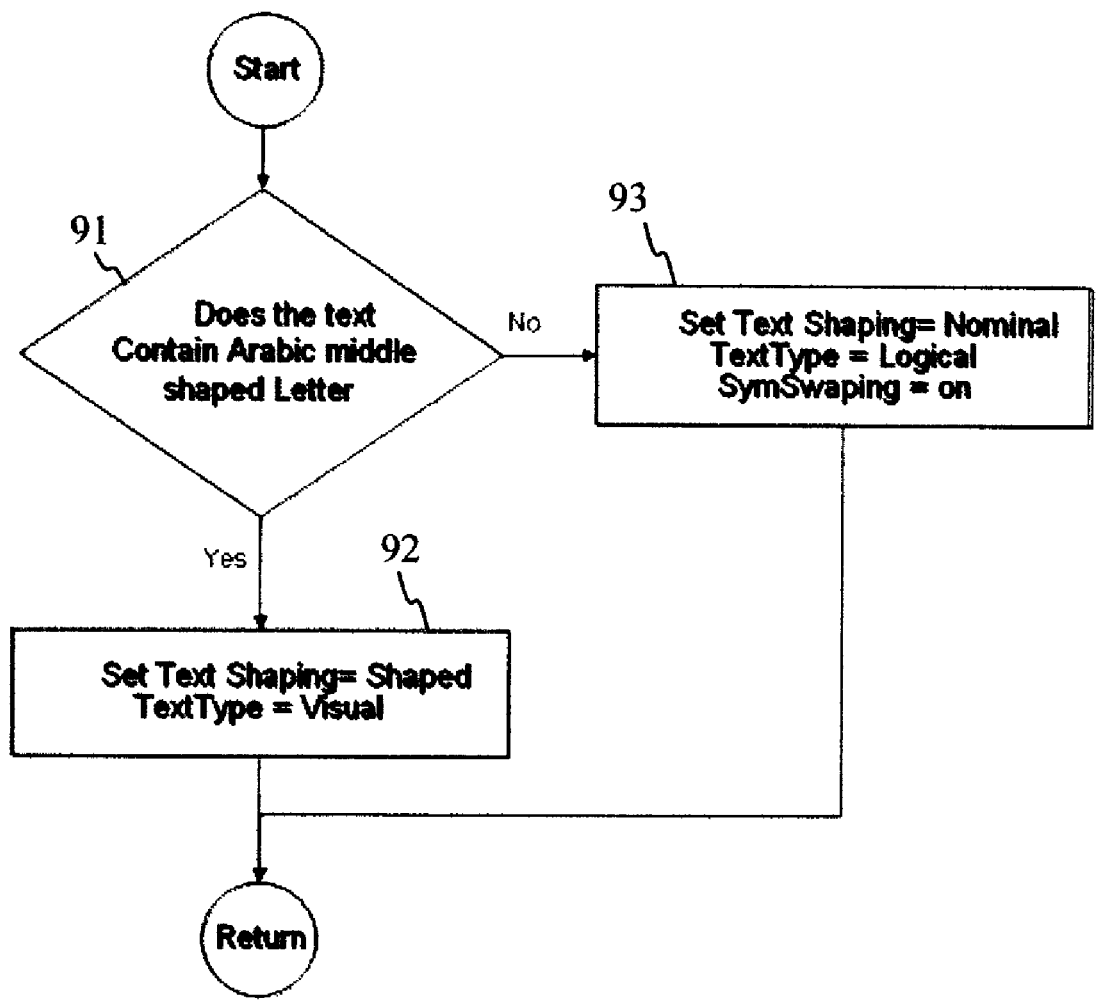
FIG. 9 shows a flowchart for detection of a text shaping attribute and text type (i.e., ordering scheme) attribute.

FIG. 9 illustrates the detection of text shaping and ordering scheme (i.e., text type) attributes (as discussed above with reference to Block 74 of FIG. 7). In Block 91, the text is searched for any Arabic character shaped in middle shape. If such character is found, then Block 92 is performed. Block 92 sets the text shaping attribute to a "shaped" value and the ordering scheme attribute (i.e., text type) to a "visual" value. If no character shaped in middle shape is found in Block 91, then the text shaping is set to "nominal", the ordering scheme (i.e., text type) is set to "logical", and the symmetric swapping is set to "ON" in Block 93.

Figure 10:
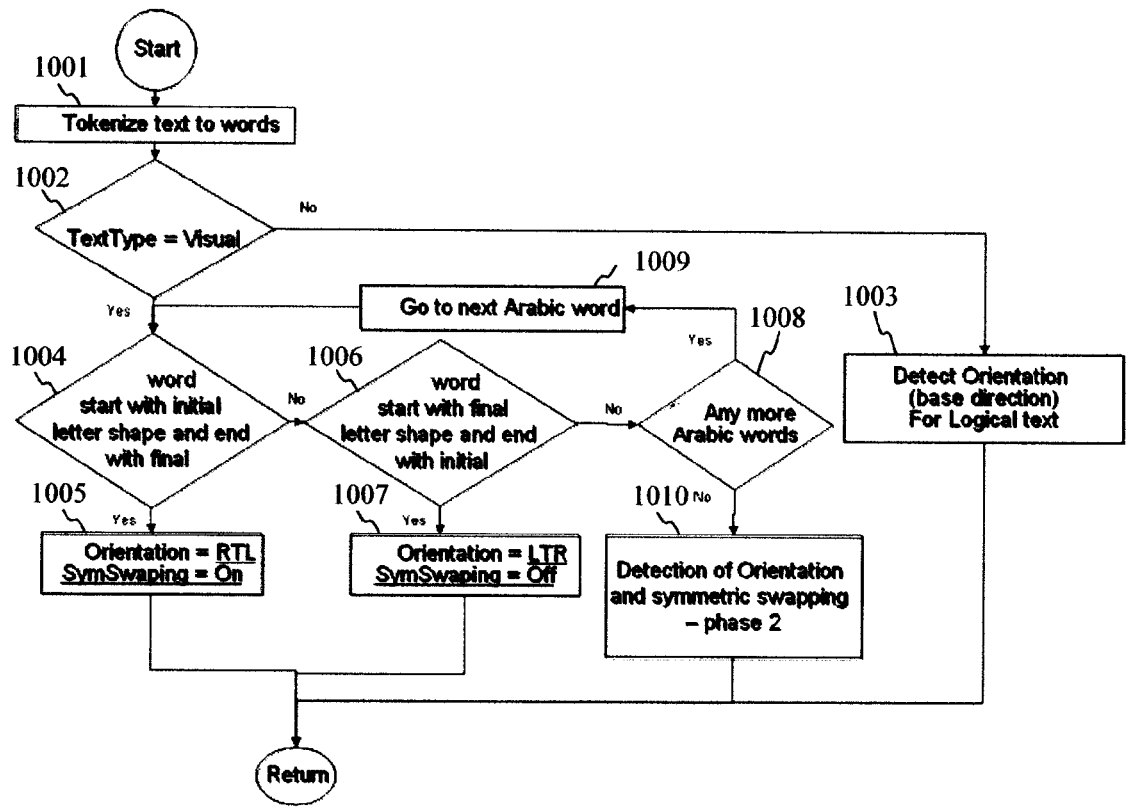
FIG. 10 shows a flowchart describing a first phase of detection of an orientation (i.e., base direction) attribute and a symmetric swapping attribute when visual text type (i.e., ordering scheme) is detected.

FIG. 10 shows a flowchart for detecting orientation (i.e., base direction) and symmetric swapping (as discussed above with reference to Block 75 of FIG. 7).

In Block 1001, the input text is tokenized to words, and a first word is processed.

Block 1002 determines if the ordering scheme (i.e., text type) attribute has a "visual" value. If the ordering scheme (i.e., text type) does not have a visual value, then Block 1003 starts the detection of the orientation (i.e., base direction) attribute for logical layout text (as discussed in more detail below, with reference to FIG. 12). If the ordering scheme (i.e., text type) has a "visual" value, then Block 1004 checks whether the first Arabic character in the word is in initial shape and the last Arabic character in the word is in final shape. If so, Block 1005 sets the orientation (i.e., base direction) attribute to RTL and the symmetric swapping attribute to "ON". If the condition of Block 1004 is not satisfied, then Block 1006 checks if the first Arabic character in the current word is in final shape and the last Arabic character is in initial shape. If this is the case, then the orientation attribute is set to LTR and the symmetric swapping attribute is set to "OFF" in Block 1007. If the condition of Block 1006 is not satisfied, then Block 1008 determines if there is a next word in the text. If there is a next word, then Block 1009 selects this next word for processing and control returns to Block 1004 for processing the next word. If all the condition of Block 1008 is not satisfied, then all the words have been processed, and the detection of orientation (i.e., base direction) and symmetric swapping attributes is performed by a second phase in Block 1010 (which is illustrated in FIG. 11).

Figure 11:
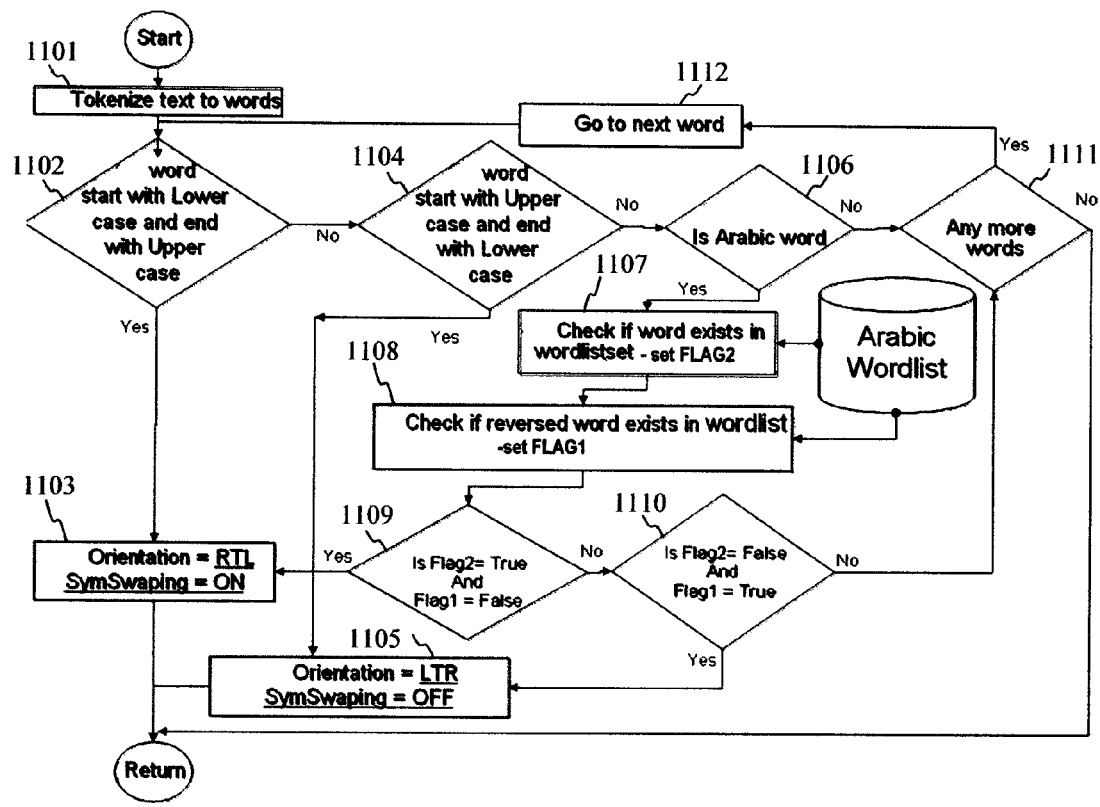
FIG. 11 shows a flowchart describing a second phase of the detection of the orientation (or base direction) attribute and of the symmetric swapping attribute when visual text type (or ordering scheme) is detected.

FIG. 11 illustrates a second phase of the detection of orientation (i.e., base direction) and symmetric swapping attributes (as discussed above with reference to Block 1010 of FIG. 10).

In Block 1101, the input text is tokenized into a set of words. The processing then starts with the first word of this set of words.

Block 1102 checks if the first character is not capitalized and the last character is capitalized. If the condition of Block 1102 is satisfied, then the orientation attribute is set to RTL and the symmetric swapping attribute is set to ON in Block 1103. If the first character is capitalized and the last character is not capitalized (Block 1104), then the orientation attribute is set to LTR and the symmetric swapping attribute is set to OFF in Block 1105. If the condition of Block 1104 is not satisfied, then Block 1106 checks if the current word is an Arabic word. If Block 1106 determines that the current word is not an Arabic word, then the next word in the text is processed after checking that all the text words have not yet been processed (Blocks 1111 and 1112). If there is no next word (Block 1111), the processing of FIG. 11 ends. If Block 1106 determines that the current word is an Arabic word, then Block 1107 checks if the current word exists in an Arabic wordlist or dictionary, and if so sets a flag "flag2" to a TRUE value. Otherwise, the flag "flag2" is set to a FALSE value. Then, in Block 1108, it is determined if the reversed version of the current word exists in the Arabic wordlist, and if so another flag "flag1" is set to a TRUE value. If not, the other flag "flag1" is set to a FALSE value. In Block 1109, the flag values are checked: if the flag "flag2" has a TRUE value and the other flag "flag1" has a FALSE value, then the orientation attribute is set to RTL and the symmetric swapping attribute is set to ON in Block 1003. Otherwise, if the flag "flag2" has a FALSE value and the other flag "flag1" has a TRUE value (Block 1110), then in Block 1105, the orientation attribute is set to LTR and the symmetric swapping attribute is set to OFF. If the condition of Block 1110 is not satisfied, the next word in the text is processed (Block 1111 and 1112) if the end of the text has not yet been reached.

Figure 12:
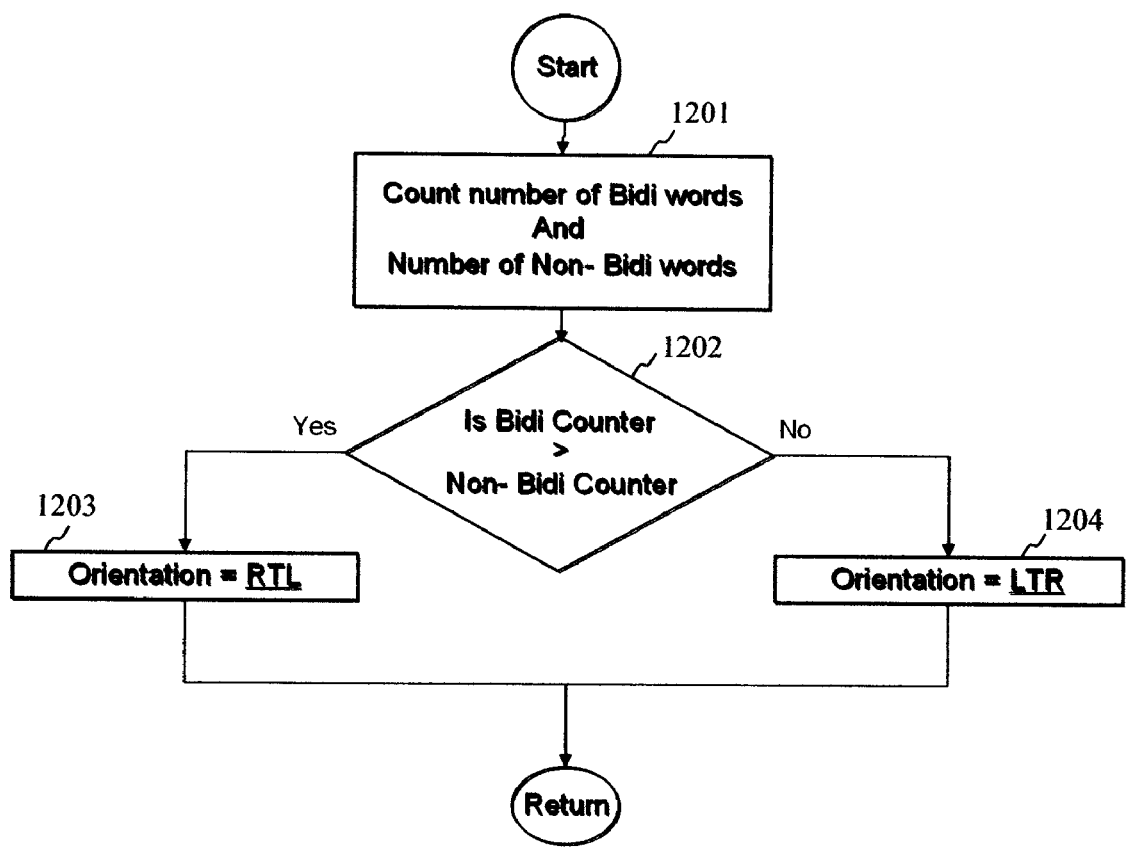
FIG. 12 shows a flowchart for detection of an orientation (or base direction) attribute and a symmetric swapping attribute when logical text type (or ordering scheme) is detected.

FIG. 12 is a flowchart illustrating the detection of orientation (i.e., base direction) for text having a logical layout (as discussed above with reference to Block 1003 of FIG. 10). Block 1201 counts the number of Arabic words using a variable "BIDI_Counter" and the number of non-Arabic words using a variable "Non_BIDI_Counter", where the distinction between Arabic and non-Arabic words is based on the Unicode character (i.e., code point) ranges. (Arabic Unicode ranges are from 0600 to 06FF and from FE70 to FEFF.) If the number of Arabic words as counted in "BIDI_Counter" is greater than the number of non-Arabic words as counted in "Non_BIDI_Counter" (Block 1202), then Block 1203 sets the orientation attribute to RTL. Otherwise, the number of non-Arabic words as counted in "Non_BIDI_Counter" is equal to or greater than the number of Arabic words as counted in "BIDI_Counter" (Block 1204), and the orientation attribute is set to LTR. (In an alternative approach to Block 1204, if both counts are equal, the orientation attribute may be set based on the bidirectionality of the first character in the text.)

Using an embodiment of the automated layout detection of the present invention eliminates the need for a manual configuration of source text BIDI layout through a dedicated user interface.

By way of illustration but not of limitation, an embodiment of the invention may provide advantages for applications involving many sources (where the plurality or sources makes it difficult to configure BIDI layout for each of them) and for applications where data are posted to a specific channel. For such applications, the source text may now be read efficiently without solving complex configuration problems.

More generally, an embodiment of the invention facilitates the interchange of Arabic text between different BIDI layout formats and addresses issues that stem from the diversity of the Arabic text layouts, in a transparent manner.

An embodiment of the invention may be used in integration adapters that integrate various applications and services to allow them to process the BIDI text in any BIDI layout.

An embodiment of the invention may also be included in database drivers that allow a database to support receiving BIDI text in any BIDI layout for rendering the text to the internal database BIDI layout.

Another application of the invention relates to software applications that focus on auto discovery of software, entities, files, etc. An embodiment of the invention allows automated detection of the BIDI layout of the discovered entities' names and contents by such software applications. Hence, it can render the BIDI layout to one internal BIDI layout, so that the entities' names and contents can be displayed in any needed BIDI layout.

Still another application of the invention concerns code page conversion systems to allow code page conversion and layout transformation without manual configuration.

Other applications of the invention include, by way of illustration but not of limitation, file editing systems for processing files in various BIDI layouts without requiring the user to specify the BIDI layout used by these files, and copy functions that copy text from an application which is using a specific BIDI layout to another application that is using a different BIDI layout. With an embodiment of the invention, it is possible to automatically transform the copied text to a common layout format that can be handled by the target application.

An embodiment of the invention accordingly allows processing a bidirectional text in different computer environments or platforms having different layouts, and provides for transformation from one layout to another. Such layout transformation may be adapted to various programming languages and encoding schemes. If the input text is received in non-Unicode encoding, a simple code page conversion unit can be used to convert the input text encoding, if known, to Unicode encoding so it can be provided as input text to an embodiment of the invention and its layout can be detected.

Aspects of the invention can take the form of an entirely hardware embodiment, an entirely software embodiment (including firmware, resident software, micro-code, etc.), or an embodiment containing both hardware and software aspects that may all generally be referred to herein as a "circuit", "module", or "system". In particular, it will be appreciated that while elements of FIGS. 4, 5, and 6 may be provided in the form of hardware, equivalent effects may be achieved in software. In a preferred embodiment, the invention is implemented in software, which includes but is not limited to firmware, resident software, microcode, etc.

Furthermore, aspects of the invention can take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently-available types of network adapters.

The foregoing is considered as illustrative, but not limiting, of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A computer-implemented method of converting a source layout of a bi-directional text to a target layout of a bi-directional text, comprising using a processor of the computer for:
   detecting a shaping attribute of said text based on scanning said text to detect at least one character of a specific shape;
   detecting a text type attribute of said text from said shaping attribute;
   detecting an orientation attribute of said text from the detected text type attribute;
   detecting a swapping attribute of said text, using the detected text type attribute and the detected orientation attribute; and
   converting the source layout to the target layout, based on the detected attributes.

2. The method of claim 1, further comprising:
   setting the swapping attribute to an OFF value if the orientation attribute is detected as LTR and the text type attribute is detected as visual;
   setting the swapping attribute to an ON value if the orientation attribute is detected as RTL and the text type attribute is detected as visual; and
   setting the swapping attribute to an ON value if the text type attribute is detected as logical.

3. The method of claim 1, wherein detecting the shaping attribute further comprises detecting if the text contains at least one middle shaped Arabic script character and:
   responsive to detecting that the text contains at least one middle shaped Arabic script character, setting the shaping attribute to a shaped value; and
   responsive to detecting that the text does not contain any middle shaped Arabic script character, setting the shaping attribute to a nominal value.

4. The method of claim 3, wherein detecting the text type attribute further comprises setting the text type attribute to a logical value if the shaping attribute is detected as equal to a nominal value and setting the text type attribute to a visual value if the shaping attribute is detected as equal to a shaped value.

5. The method of claim 4, wherein detecting the orientation attribute further comprises detecting if the text type attribute is visual and if so, dividing the text into a set of words, and for each word, identifying a shape of a first letter in the word and a shape of a last letter in the word.

6. The method of claim 5, further comprising:
   responsive to identifying the shape of the first letter in the word as an initial letter shape and the shape of the last letter in the word as a final letter shape, setting the orientation attribute to an RTL value; and
   responsive to identifying the shape of the first letter in the word as the final letter shape and the shape of the last letter in the word as the initial letter shape, setting the orientation attribute to an LTR value.

7. The method of claim 1, wherein detecting the orientation attribute further comprises dividing the text into a set of words, and for each word, identifying a Latin word letter case of a first letter in a non-Arabic script word and the Latin letter case of a last letter in the non-Arabic script word in said text, if the text contains no word starting with an initial letter shape and ending with a final letter shape and no word starting with a final letter shape and ending with an initial letter shape.

8. The method of claim 7, further comprising:
   setting the orientation attribute to an RTL value if a word is detected as starting with the final letter shape and ending with the initial letter shape; and
   setting the orientation attribute to an LTR value if the word is detected as starting with the initial letter shape and ending with the final letter shape.

9. The method of claim 7, wherein if the text contains no word starting with the initial letter shape and ending with the final letter shape and if the text contains no word starting with the final letter shape and ending with the initial letter shape, the orientation attribute is detected based on a result of searching for each Arabic script word contained in said text and a corresponding reversed version of the Arabic script word in Arabic script word lists.

10. The method of claim 1, further comprising comparing, responsive to detecting that the text type attribute is logical, a number of Arabic script words in the text to a number of non-Arabic script words in the text, and:
   if the number of Arabic script words in the text is higher than the number of non-Arabic script words in the text, setting the orientation attribute to RTL;
   if the number of Arabic script words in the text is lower than the number of non-Arabic script words in the text, setting the orientation attribute to LTR; and if the number of Arabic script words in the text is equal to the number of non-Arabic script words in the text, setting the orientation attribute based on a bi-directionality of a first character in the text.

11. The method of claim 1, further comprising detecting a numeric shaping attribute of said text, comprising scanning the text for code points of digits using defined Unicode ranges for the digits.

12. A computer program product for converting a source a layout of a bi-directional text to a target layout of a bi-directional text, the computer program product comprising a non-transitory computer-readable storage medium having computer-readable program code embodied therewith, the computer-readable program code configured for:

detecting a shaping attribute of the text based on scanning the text to detect at least one character of a specific shape;

detecting a text type attribute of the text from the shaping attribute;

detecting an orientation attribute of the text from the detected text type attribute;

detecting a swapping attribute of said text, using the detected text type attribute and the detected orientation attribute; and converting the source layout to the target layout, based on the detected attributes.

13. A system for converting a source layout of a bi-directional text to a target layout of a bi-directional text, comprising:

a computer comprising a processor; and instructions which are executable, using the processor, to implement functions comprising:

detecting a shaping attribute of the text based on scanning the text to detect at least one character of a specific shape;

detecting a text type attribute of the text from the shaping attribute;

detecting an orientation attribute of the text from the detected text type attribute;

detecting a swapping attribute of said text, using the detected text type attribute and the detected orientation attribute; and converting the source layout to the target layout, based on the detected attributes.

\* \* \* \* \*